(12) United States Patent
Maalouf et al.

(10) Patent No.: US 12,434,852 B2
(45) Date of Patent: Oct. 7, 2025

(54) SYSTEM FOR CONTROLLING THE TEMPERATURE OF A HEAT TRANSFER FLUID IN A CIRCULATION LOOP, AND TEMPERATURE CONTROL METHOD

(71) Applicant: SAFRAN, Paris (FR)

(72) Inventors: Samer Maalouf, Moissy-Cramayel (FR); Adrien Cahuzac, Moissy-Cramayel (FR); Nicolas Claude Parmentier, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/858,431

(22) PCT Filed: Apr. 25, 2023

(86) PCT No.: PCT/EP2023/060710
§ 371 (c)(1),
(2) Date: Oct. 21, 2024

(87) PCT Pub. No.: WO2023/208872
PCT Pub. Date: Nov. 2, 2023

(65) Prior Publication Data
US 2025/0282487 A1    Sep. 11, 2025

(30) Foreign Application Priority Data
Apr. 26, 2022 (FR) .......................... 2203889

(51) Int. Cl.
*F02C 7/22* (2006.01)
*B64D 37/02* (2006.01)
(Continued)

(52) U.S. Cl.
CPC ............ *B64D 37/34* (2013.01); *B64D 37/02* (2013.01); *F02C 3/22* (2013.01); *F02C 7/14* (2013.01);
(Continued)

(58) Field of Classification Search
CPC ... F02C 7/224; F02C 7/14; F02C 7/16; B64D 37/34; F05D 2260/213; F01P 7/165
See application file for complete search history.

(56) References Cited

U.S. PATENT DOCUMENTS

| 4,696,156 | A | * | 9/1987 | Burr | ....................... B64D 37/34 60/39.08 |
| 6,415,595 | B1 | * | 7/2002 | Wilmot, Jr. | ............. F02C 7/224 60/785 |

(Continued)

FOREIGN PATENT DOCUMENTS

| FR | 2914365 A1 | 10/2008 |
| FR | 3110938 A1 | 12/2021 |
| WO | 02/16743 A1 | 2/2002 |

OTHER PUBLICATIONS

French Search Report for French Patent Application FR2203889 (dated Nov. 30, 2022).

*Primary Examiner* — Justin D Seabe
(74) *Attorney, Agent, or Firm* — Alumen IP Law PC

(57) ABSTRACT

The invention relates to a system (1) for controlling the temperature of a heat transfer fluid (F) configured to transfer heat to a fluid to be heated (Q) originating from a cryogenic tank (R), the control system (1) comprising: a loop (2) for circulating the heat transfer fluid (F), comprising an engine branch (21) and a tank branch (22); a first engine heat exchanger (41), configured to heat the heat transfer fluid (F) to a second temperature (T2) above a maximum operating temperature (Tmax); a mechanical pump (3) configured to circulate the heat transfer fluid (F) in the circulation loop (2), such that, in a second engine heat exchanger (42), a first part of the heat is transferred from the heat transfer fluid (F) to the fluid to be heated (Q) and the heat transfer fluid (F) is (Continued)

cooled to a third temperature (T3) below the maximum operating temperature (Tmax), before it leaves the engine enclosure (EN-M).

13 Claims, 4 Drawing Sheets

(51) Int. Cl.
*B64D 37/34* (2006.01)
*F02C 3/22* (2006.01)
*F02C 7/14* (2006.01)
*F02C 7/224* (2006.01)

(52) U.S. Cl.
CPC ........ *F02C 7/224* (2013.01); *F05D 2260/213* (2013.01)

(56) References Cited

U.S. PATENT DOCUMENTS

| | | | | |
|---|---|---|---|---|
| 9,739,171 | B2* | 8/2017 | Blair | F28F 1/40 |
| 10,752,374 | B1* | 8/2020 | Lui | B64D 13/08 |
| 2017/0030266 | A1* | 2/2017 | Cerny | F02C 7/224 |
| 2021/0207540 | A1* | 7/2021 | Roberge | F02C 9/40 |

* cited by examiner

SYSTEM FOR CONTROLLING THE TEMPERATURE OF A HEAT TRANSFER FLUID IN A CIRCULATION LOOP, AND TEMPERATURE CONTROL METHOD

TECHNICAL FIELD

This invention relates to the field of aircrafts comprising a fluid stored in a cryogenic tank, for example fuel supplying a turbomachine.

It is known to store a fluid, for example fuel such as hydrogen, in liquid form to limit the overall dimension and the weight of the tanks of the aircraft. For example, the fuel is stored at a temperature of around −253 to −251° C. (20 to 22 Kelvin) in a cryogenic tank on the aircraft, In this example, in order to be injected into the combustion chamber of a turbomachine, the fuel has to be conditioned, i.e. pressurized and heated, to allow an optimum combustion. A conditioning is required, for example, to reduce the risk of icing/solidification of the water vapor contained in the air circulating in the turbomachine, particularly at the level of the fuel injectors of the turbomachine.

With reference to FIG. 1, a conditioning system SCAA is shown comprising a fuel circuit CQ connected at the inlet to a cryogenic tank R and at the outlet to the combustion chamber of a turbomachine M. The conditioning system SCAA comprises a mechanical pump P for driving a fuel flow Qc from upstream to downstream in the fuel circuit CQ. In a known way, the aircraft comprises an engine enclosure EN-M (for example a nacelle) and a tank enclosure EN-R, separate and distant from the engine enclosure EN-M. The cryogenic tank R is mounted in the tank enclosure EN-R and the turbomachine M is mounted in the engine enclosure EN-M.

The conditioning system SCAA also comprises a temperature control system for controlling the temperature 101 of a heat transfer fluid F, which adds calories to the fuel flow Qc to warm it up so that it may be injected into the turbomachine M at an optimum temperature and pressure.

In the prior art, a temperature control system 101 is known for example in the patent application FR2005628A1, also shown in FIG. 1, which comprises a circulation loop 102 for circulating the heat transfer fluid F and a mechanical recirculation pump 103 for driving the heat transfer fluid F in motion in the circulation loop 102. In the control system 101 described in the document FR2005628A1, the heat transfer fluid F extracts the calories from hot sources Cm available on board of the aircraft (for example the heat from the lubricating oil of the turbomachine M, the calories at the turbine outlet, heat from the nozzle), via an engine heat exchanger 104 mounted on the circulation loop 102 in the assembly enclosure EN-M. The temperature control system 101 for controlling the temperature also comprises a tank heat exchanger 105 for warming the fuel flow Qc of the conditioning system SCAA from the calories transferred by the heat transfer fluid F.

In practice, the hot sources Cm present in the engine enclosure EN-M allow the heat transfer fluid F to be warmed via the engine heat exchanger 104 from a first temperature T1 to a second temperature T2. The heat transfer fluid F then circulates at temperature T2 in the circulation loop 102 as far as the tank exchanger 105 to warm the fuel flow Qc at the outlet of the mechanical pump P, i.e. in the tank enclosure EN-R. In a non-represented embodiment, the architecture described in the patent FR2005628A1 also comprises a heat exchanger mounted in the tank enclosure EN-R to warm the heat transfer fluid F once again using the hot sources present in the tank enclosure EN-R, such as the air leaving the cabin or the thermal waste from the on-board electrical/electronic components, for example.

However, as is well known, in such a control system 101, the temperature of the heat transfer fluid F must not exceed a predetermined temperature range. In practice, the temperature T2 of the heat transfer fluid F at the outlet of the engine enclosure EN-M must be lower than a maximum operating temperature Tmax, in order to be able to convey the heat transfer fluid F as close as possible to the tank R without risking damage to the structure of the aircraft through which the circulation loop 102 passes, such as the wings of the aircraft for example. In addition, the temperature T1 of the heat transfer fluid F at the inlet to the engine enclosure EN-M must be higher than a minimum operating temperature Tmin, in order to avoid any risk of icing of the hot sources Cm in the engine heat exchanger 104. In other words, the temperature control in the circulation loop 102 is highly constrained.

To limit the maximum temperature of the heat transfer fluid F leaving the engine heat exchanger 104, it is known to increase the flow rate of the heat transfer fluid F in the circulation loop 102, which has a number of disadvantages. This is because the piping of the circulation loop 102 is very heavy and bulky, which is undesirable in an aircraft. In addition, the aerothermal performance of the heat exchangers is limited, which increases the distribution faults in the heat exchangers. The mechanical pump also has to operate at a higher flow rate, which increases its electricity consumption.

The invention thus aims to eliminate at least some of these disadvantages by proposing a new temperature control system for controlling the temperature of the heat transfer fluid in the circulation loop, allowing an efficient and reliable heating without limiting the temperature range of the heat transfer fluid.

SUMMARY

The invention relates to a temperature control system for controlling the temperature of a heat transfer fluid configured to transfer calories to a fluid to be warmed, the fluid to be warmed coming from a cryogenic tank wherein it is stored at an initial temperature and configured to be conveyed to an engine via a fluid circuit, the cryogenic tank being mounted in a tank enclosure, the engine being mounted in an engine enclosure separate from the tank enclosure, the tank enclosure being configured to operate at a temperature lower than a maximum operating temperature, the engine enclosure being configured to operate at a temperature above a minimum operating temperature, the control system comprising:

a circulation loop for circulating the heat transfer fluid extending both in the tank enclosure and in the engine enclosure, the circulation loop comprising:

an engine branch extending in the engine enclosure between an engine inlet point and an engine outlet point, the heat transfer fluid circulating from upstream to downstream between the engine inlet point and the engine outlet point, the heat transfer fluid having a first temperature at the engine inlet point, the first temperature being higher than the minimum operating temperature of the engine enclosure, a tank branch extending in the tank enclosure between a tank inlet point and a tank outlet point, the heat transfer fluid circulating from upstream to downstream between the tank inlet point and the tank outlet point, the engine outlet point being fluidly connected to the tank inlet point, the tank outlet point being fluidly connected to the engine inlet point, at least one first engine heat exchanger, mounted on the engine branch, configured to warm the heat transfer fluid to a second temperature higher than the first temperature, from calories transferred by at least one hot fluid available in the engine enclosure, the second temperature being higher than the maximum operating temperature of the tank enclosure, at least one first tank exchanger, mounted on the tank branch, configured to warm the fluid to be heated from the heat transfer fluid to a primary temperature, at least one second engine exchanger, mounted on the engine branch, configured to warm the fluid to be warmed from the heat transfer fluid to a secondary temperature, higher than the primary temperature, at least one mechanical pump configured to circulate the heat transfer fluid in the circulation loop, so as to:

in the second engine exchanger, transferring a first part of calories from the heat transfer fluid to the fluid to be warmed and cooling the heat transfer fluid to a third temperature lower than the second temperature, the third temperature being lower than the maximum operating temperature, so as to heat the heat transfer fluid in the first engine exchanger to a temperature higher than the maximum operating temperature and to lower this temperature in the second engine exchanger below the maximum operating temperature, before it leaves the engine enclosure and enters the tank enclosure, in the first tank exchanger, transferring a second part of calories from the heat transfer fluid to the fluid to be warmed and cooling the heat transfer fluid to a fourth temperature, lower than the third temperature, so as to heat the fluid to be warmed to the secondary temperature, so as to warm the fluid to be warmed before it leaves the tank enclosure.

The control system according to the invention allows the heat transfer fluid to be heated by the first engine exchanger to a temperature above the maximum operating temperature, which means that the circulation flow rate of the heat transfer fluid in the circulation loop is not increased. The advantage of a limited flow rate is that it reduces the mass and the overall dimension of the piping in the circulation loop, as it does not need to be reinforced to withstand particularly high flow rates. A flow rate limit also allows to optimize the aerothermal performance of the heat exchangers mounted on the circulation loop, thereby allowing to limit the risk of distribution faults of the fluids in the heat exchangers. Moreover, the mechanical pump does not have to operate at a particularly high flow rate, which allows to reduce wear and electricity consumption.

The control system according to the invention also allows the fluid to be warmed to be heated in two stages. In a first stage, the fluid to be warmed is heated in the first tank exchanger to the primary temperature, allowing to ensure the best compromise between simplicity and safety in the implementation of the circuit. In a second stage, the fluid to be warmed is heated in the second engine heat exchanger to a secondary temperature high enough to allow fuel to be injected into the turbomachine to supply it, for example.

In one embodiment, the control system comprises at least one second tank exchanger, mounted on the tank branch, the second tank exchanger being configured to warm the heat transfer fluid from calories transferred by at least one hot fluid available in the tank enclosure. In a first embodiment, the second tank exchanger is configured to be mounted downstream of the first tank exchanger, the second tank exchanger then being configured to warm the heat transfer fluid from the fourth temperature to the first temperature. The heat transfer fluid may therefore be cooled to a greater extent in the first tank exchanger, transferring more calories to the fuel flow. This further allows to reduce the heat transfer fluid flow rate. In a second embodiment, the second tank exchanger is configured to be mounted upstream of the first tank exchanger. Such a second tank exchanger allows to use the heat available on board the aircraft and thus limit, for example, the size and the overall dimension of a heat exchanger in a turbomachine.

In this embodiment, the fourth temperature of the heat transfer fluid at the outlet of the first tank exchanger is between −123° C. (150K) and 2° C. (275K), allowing the temperature of the heat transfer fluid in the first tank exchanger to be lowered locally than the minimum operating temperature and then warmed. This further allows to reduce the heat transfer fluid flow rate.

In a second embodiment, the fourth temperature of the heat transfer fluid at the outlet of the first tank exchanger is between 2° C. (275K) and 77° C. (350K). The temperature of the heat transfer fluid is therefore higher than 2° C. (275K) when it enters the heat exchanger with a hot source, allowing to limit any risk of icing of the hot sources in the heat exchanger.

Preferably, the second temperature of the heat transfer fluid at the outlet of the first engine exchanger is between 227° C. (500K) and 377° C. (650K), which allows to reduce the flow rate of the heat transfer fluid, thus allowing the use of less heavy and less bulky piping. The heat transfer fluid may therefore be heated to a temperature higher than the maximum operating temperature, i.e. 227° C. (500K), as it will begin by transferring calories to the fuel flow in the engine enclosure.

In a preferred embodiment, the third temperature of the heat transfer fluid at the outlet of the second engine exchanger is between 77° C. (350K) and 227° C. (500K). The temperature of the heat transfer fluid is therefore lower than the maximum operating temperature on leaving the engine enclosure. This allows the heat transfer fluid to circulate between the engine enclosure and the tank enclosure, for example in the structure of an aircraft (e.g. in the wings) without any risk of damage. Moreover, the fluid does not need to be transported in special piping to withstand high temperatures, piping which would be very heavy, bulky and/or expensive.

In one embodiment, the third temperature of the heat transfer fluid at the outlet of the second engine exchanger is less than 202° C. (475K), preferably less than 177° C. (450K). Such a temperature means that aluminum piping may be used instead of stainless steel piping as in the prior art, resulting in significant weight savings.

In one embodiment, the control system comprises a controllable valve mounted on the circulation loop between the second engine exchanger and the first tank exchanger, so as to direct a first part of the heat transfer fluid towards the first tank exchanger and towards the engine enclosure and a second part of the heat transfer fluid towards the first engine exchanger, so as to allow a lower flow rate of the heat transfer fluid towards the engine enclosure. This type of controllable valve allows the circuit to be regulated while maintaining an optimum extraction of calories from the engine sources.

In one embodiment, the control system comprises a regenerative heat exchanger, mounted on the engine branch, the regenerative heat exchanger being configured to warm the heat transfer fluid upstream of the first engine exchanger by the heat transfer fluid downstream of the first engine exchanger. Thanks to a regenerative heat exchanger of this type, the heat transfer fluid may be cooled at the outlet of the first tank exchanger to a temperature below the minimum operating temperature without this presenting a risk of icing the hot sources in the first engine exchanger. A greater cooling in the first tank exchanger allows the heat transfer fluid to transfer more calories to the fluid to be heated (at an iso flow rate of heat transfer fluid), allowing the fluid to be warmed to a greater extent while limiting the electricity consumption of the system.

The invention also relates to a fuel conditioning system configured to supply an aircraft turbomachine with fuel from a cryogenic tank, the conditioning system extending in the tank enclosure and in the engine enclosure, the cryogenic tank being mounted in the tank enclosure and the turbomachine being mounted in the engine enclosure, the conditioning system comprising:
- a fuel circuit connected at the inlet to the cryogenic tank and at the outlet to the turbomachine, with a fuel flow circulating from upstream to downstream in the fuel circuit,
- at least one mechanical pump configured to circulate the fuel flow from the cryogenic tank upstream and downstream in the fuel circuit, and
- a temperature control system for controlling the temperature as described above.

In a preferred embodiment, the primary temperature of the fuel flow at the outlet of the first tank exchanger is between −173° C. (100K) and −73° C. (200K), which allows to ensure that the fuel is in a gaseous state at the outlet of the first tank exchanger, allowing to limit the use of specific piping which would have a special thermal insulation and would therefore be heavier and bulkier.

Preferably, the secondary temperature of the fuel flow at the outlet of the second engine heat exchanger is between −73° C. (200K) and 27° C. (300K), corresponding to the fuel injection temperature in the combustion chamber of the turbomachine, which allows to limit the risk of icing of the injectors mounted in the combustion chamber.

The invention also relates to an aircraft comprising a cryogenic tank, a turbomachine and a conditioning system as described above.

Finally, the invention relates to a method for controlling the temperature of the heat transfer fluid by means of the control system as described above, the method comprising the steps of:
- heating the heat transfer fluid in the engine enclosure in the first engine exchanger to a second temperature above the maximum operating temperature of the tank enclosure,
- cooling the heat transfer fluid in the engine enclosure in the second engine exchanger to a third temperature below the maximum operating temperature,
- conveying the heat transfer fluid towards the tank enclosure.

The invention also relates to a temperature control system for controlling the temperature of a heat transfer fluid configured to transfer calories to a fluid to be warmed, the fluid to be warmed being taken from a cryogenic tank wherein it is stored at an initial temperature and configured to be conveyed towards an engine via a fluid circuit, the cryogenic tank being mounted in a tank enclosure, the engine being mounted in an engine enclosure separate from the tank enclosure, the control system comprising:
- a heat transfer fluid circulation loop extending both in the tank enclosure and in the engine enclosure, the circulation loop comprising:
  - an engine branch extending in the engine enclosure between an engine inlet point and an engine outlet point, the heat transfer fluid circulating from upstream to downstream between the engine inlet point and the engine outlet point, the heat transfer fluid having a first temperature at the engine inlet point,
  - a tank branch extending in the tank enclosure between a tank inlet point and a tank outlet point, the heat transfer fluid circulating from upstream to downstream between the tank inlet point and the tank outlet point, the engine outlet point being fluidly connected to the tank inlet point, the tank outlet point being fluidly connected to the engine inlet point,
- at least one mechanical pump configured to circulate the heat transfer fluid in the circulation loop,
- at least one first engine heat exchanger, mounted on the engine branch, configured to warm the heat transfer fluid to a third temperature higher than the first temperature, from calories transferred by at least one hot fluid available in the engine enclosure, the third temperature being higher than a maximum operating temperature,
- at least one first tank exchanger, mounted on the tank branch, configured to warm the fluid to be warmed from calories transferred by the heat transfer fluid to a primary temperature,
- at least one regenerative heat exchanger, mounted on the engine branch, the regenerative heat exchanger being configured to warm the heat transfer fluid to a second temperature higher than the first temperature and lower than the third temperature, the second temperature being higher than a minimum operating temperature, the regenerative heat exchanger being configured to transfer calories from the heat transfer fluid circulating downstream of the first engine exchanger at the third temperature to the heat transfer fluid circulating upstream of the first engine exchanger at the first temperature, so as to allow the heat transfer fluid to be warmed in the first engine exchanger to a temperature above the maximum operating temperature and to be cooled before leaving the engine enclosure to a temperature below the minimum operating temperature.

The control system described above allows the heat transfer fluid to enter the engine enclosure at a temperature below the minimum operating temperature. A greater cooling allows the heat transfer fluid to transfer more calories to the fluid to be warmed in the first tank exchanger, allowing the fluid to be warmed to a greater extent. As the heat transfer fluid is advantageously warmed by the regenerative heat exchanger before entering the first engine exchanger, the circulation loop does not present any risk of icing up the hot source or sources in the first engine exchanger.

Advantageously, the heat transfer fluid may also be heated by the first engine exchanger to a temperature above the maximum operating temperature, which means that the flow rate of the heat transfer fluid through the first engine exchanger is not increased. The advantage of a limited flow rate is that it allows to reduce the mass and the overall dimension of the piping in the circulation loop, as it does not need to be reinforced to withstand particularly high flow rates. A limited flow rate also allows to optimize the aerothermal performance of the heat exchangers mounted on the circulation loop, thereby allowing to limit the risk of the fluid distribution faults in the heat exchangers. Moreover, the mechanical pump does not have to operate at a particularly high flow rate, which allows to reduce wear and electricity consumption.

BRIEF DESCRIPTION OF THE DRAWINGS

The invention will be better understood on reading the following description, given by way of example, with reference to the following figures, given by way of non-limiting examples, wherein identical references are given to similar objects.

It should be noted that the figures set out the invention in detail in order to implement the invention, said figures of course being able to be used to better define the invention if necessary.

DETAILED DESCRIPTION

Figure 1:
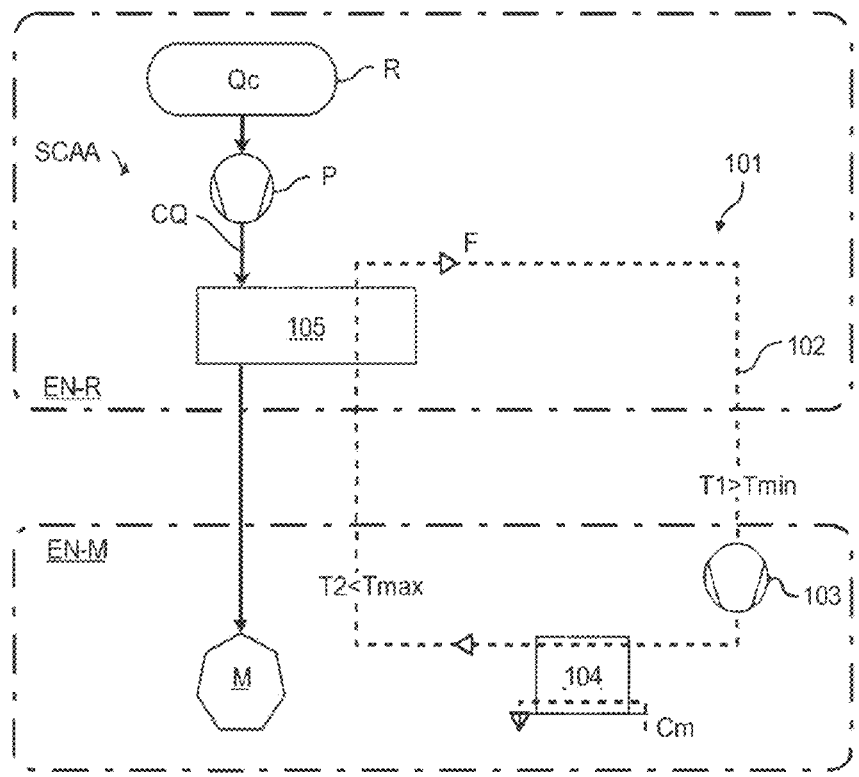
FIG. 1 is a schematic representation of a conditioning system comprising a control system according to the prior art.
Figure 2:
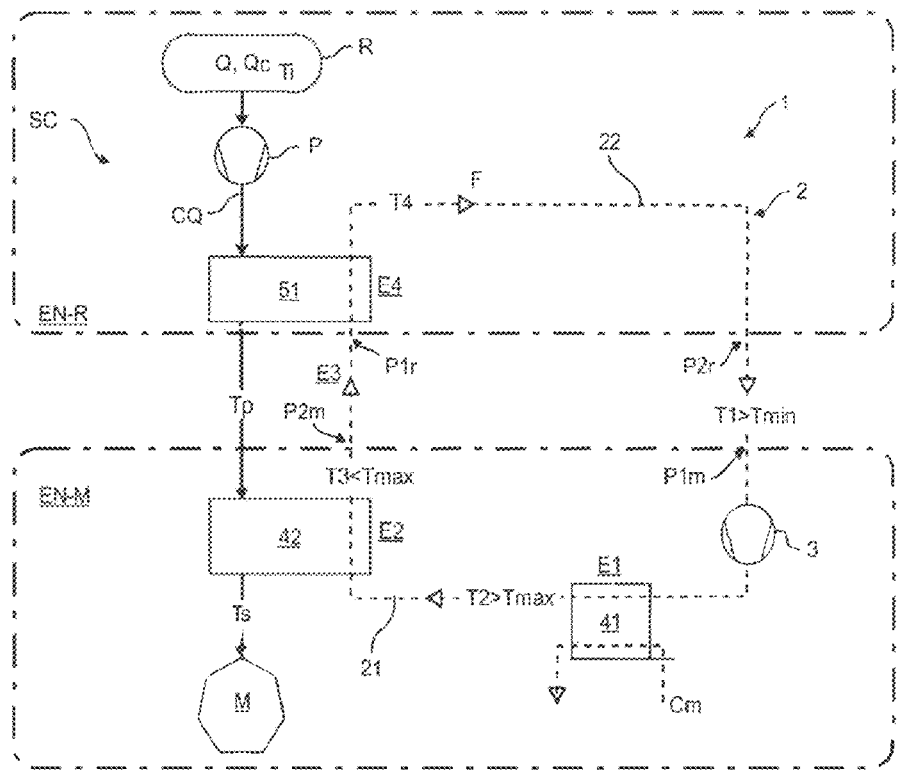
FIG. 2 is a schematic representation of a conditioning system comprising a control system according to one embodiment of the invention.

With reference to FIG. 2, a conditioning system SC for conditioning a fluid to be warmed Q from a cryogenic tank R is shown. In this example, the fluid to be warmed Q is stored in the cryogenic tank R at an initial temperature T1 of the order of −253° C. (20K) to −251° C. (22K). At this temperature, the fluid to be warmed Q is liquid.

In this example, the fluid to be warmed Q is fuel configured to supply an engine, in particular in this example an aircraft turbomachine M. It goes without saying that the fluid to be warmed Q could be different, in particular from the oxidizer (oxygen) or inert service gases (nitrogen, CO2). In this example, the turbomachine M is configured to propel the aircraft, in particular by driving at least one propulsion member. Finally, in this example, the fuel is liquid hydrogen, but it goes without saying that the invention applies to other types of fuel, for example liquid methane or liquefied natural gas.

As shown in FIG. 2, the cryogenic tank R is mounted in a tank enclosure EN-R and the engine M is mounted in an engine enclosure EN-M, separate from the tank enclosure EN-R. The conditioning system SC extends both in the engine enclosure EN-M and the tank enclosure EN-R.

In this example, the conditioning system SC comprises a fuel circuit CQ connected at the inlet to the cryogenic tank R and at the outlet to the turbomachine M, and a mechanical pump P configured to circulate a fuel flow Qc to be warmed from the cryogenic tank R from upstream to downstream in the fuel circuit CQ. It goes without saying that the conditioning system SC could comprise a different number of mechanical pumps P, in particular a number greater than one mechanical pump P.

The conditioning system SC also comprises a temperature control system 1 for controlling the temperature of a heat transfer fluid F according to the invention, configured to transfer calories to the fuel flow Qc so as to warm it so that it may supply the turbomachine M.

According to the invention, still with reference to FIG. 2, the control system 1 comprises a circulation loop 2 for circulating the heat transfer fluid F extending both into the tank enclosure EN-R and into the engine enclosure EN-M. The tank enclosure EN-R is configured to operate at a temperature higher than a minimum operating temperature Tmin to avoid icing the hot sources in the heat exchangers, as will be described in more detail later. The expression "configured to operate at a temperature" means that the fluids (fuel flow Qc, heat transfer fluid F, hot fluids, etc.) circulate at a temperature above the minimum operating temperature Tmin. Similarly, the engine enclosure EN-M is configured to operate at a temperature below a maximum operating temperature Tmax at the outlet of the engine enclosure EN-M, to avoid any risk of damage to the structure of the aircraft during the circulation of the heat transfer fluid F between the engine enclosure EN-M and the tank enclosure EN-R.

In this example, the minimum operating temperature Tmin is around 2° C. (275K). Similarly, in this example, the maximum operating temperature Tmax is around 227° C. (500K).

According to the invention, the circulation loop 2 comprises an engine branch 21 extending in the engine enclosure EN-M between an engine inlet point P1$m$ and an engine outlet point P2$m$, and a tank branch 22 extending in the tank enclosure EN-R between a tank inlet point P1$r$ and a tank outlet point P2$r$. The engine outlet point P2$m$ is fluidly connected to the tank inlet point P1$r$ and the tank outlet point P2$r$ is fluidly connected to the engine inlet point P1$m$, so as to allow continuous circulation of the heat transfer fluid F in the circulation loop 2.

The heat transfer fluid F circulates in the engine branch 21 from upstream to downstream between the engine inlet point P1$m$ and the engine outlet point P2$m$, and in the tank branch 22 from upstream to downstream between the tank inlet point P1$r$ and the tank outlet point P2$r$.

At the engine inlet point P1$m$, the heat transfer fluid F has a first temperature T1 higher than the minimum operating temperature Tmin. In this example, the first temperature T1 is between 2° C. (275K) and 90° C. (363K). Preferably the first temperature T1 is greater than 2° C. (275K).

Figure 3:
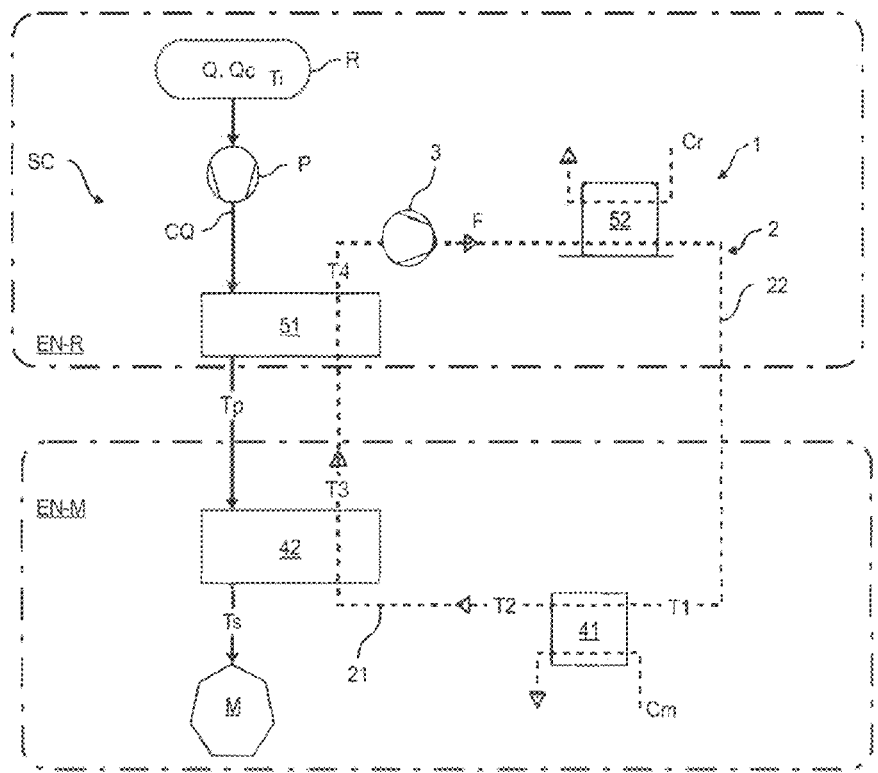
FIG. 3 is a schematic representation of a control system according to a second embodiment of the invention.

Still referring to FIG. 2, the control system 1 comprises a mechanical pump 3 configured to circulate the heat transfer fluid F in the circulation loop 2. It goes without saying that the circulation loop 2 could comprise a different number of mechanical pumps 3. Preferably, the mechanical pump 3 is positioned in the circulation loop 2 so as to receive the heat transfer fluid F with the minimum temperature, so as to take advantage of the maximum density of the heat transfer fluid F, which allows to pump the same mass flow rate at a lower energy cost. In this example, the mechanical pump 3 is mounted in the engine enclosure EN-M, as shown in FIG. 2. It goes without saying that the mechanical pump 3 could also be mounted in the tank enclosure EN-R, as shown in FIG. 3, According to the invention, the control system 1 comprises a first engine exchanger 41, a second engine exchanger 42 and a first tank exchanger 51, mounted on the circulation loop 2.

The first engine exchanger 41 is mounted in the engine enclosure EN-M on the engine branch 21. The first engine heat exchanger 41 is of the heat transfer fluid/hot fluid type and is configured to warm the heat transfer fluid F from calories transferred by one or more hot fluids Cm available in the engine enclosure EN-M, for example the heat from the lubricating oil of the turbomachine M, the calories at the turbine outlet, the heat from the nozzle, etc.

The first engine exchanger 41 is configured to warm the heat transfer fluid F to a second temperature T2 higher than the first temperature T1. More specifically, according to the invention, the second temperature T2 is higher than the maximum operating temperature Tmax, in this example of the order of 227° C. (500K). In particular, in this example, the second temperature T2 of the heat transfer fluid F at the outlet of the first engine exchanger 41 is between 227° C. (500K) and 377° C. (650K), which advantageously allows to limit the flow rate of the heat transfer fluid F in the circulation loop 2.

The first tank exchanger 51 is mounted in the tank enclosure EN-R on the tank branch 22. The first tank exchanger 51 is of the heat transfer fluid/fluid to be warmed Q type, in this example fuel flow Qc, and is configured to warm the fuel flow Qc from the heat transfer fluid F to a primary temperature Tp higher than the initial temperature Ti. Preferably, the primary temperature Tp of the fuel flow Qc at the outlet of the first tank exchanger 51 is between −173° C. (100K) and −73° C. (200K), so as to ensure that the fuel flow Qc is in a gaseous state at the outlet of the first tank exchanger 51.

The second engine exchanger 42 is mounted in the engine enclosure EN-M on the engine branch 21. The second engine exchanger 42 is of the heat transfer fluid/fluid to be warmed type Q (in this case fuel flow Qc) and is configured to warm the fuel flow Qc from the heat transfer fluid F to a secondary temperature Ts, higher than the primary temperature Tp. Preferably, the secondary temperature Ts of the fuel flow Qc at the outlet of the second engine heat exchanger 42 is between −73° C. (200K) and 27° C. (300K). Such a temperature allows, for example, to limit any risk of icing of the water vapor contained in the air in contact with the fuel injectors in the combustion chamber of the turbomachine M.

According to the invention, as shown in FIG. 2, after being warmed by the first engine exchanger 41, the heat transfer fluid F is configured to circulate in the circulation loop 2 successively through the second engine exchanger 42 and in the first tank exchanger 51. In other words, the heat transfer fluid F circulates in the circulation loop 2 between the second engine heat exchanger 42 and the first tank exchanger 51 in a direction opposite to the direction of circulation of the fuel flow Qc in the fuel circuit CQ.

In the second engine exchanger 42, the heat transfer fluid F is configured to transfer a first part of calories to the fuel flow Qc. The heat transfer fluid F is then configured to be cooled to a third temperature T3 lower than the second temperature T2. The third temperature T3 is lower than the maximum operating temperature Tmax. The second engine exchanger 42 is thus configured to lower the temperature of the heat transfer fluid F (by warming the fuel flow Qc to the secondary temperature Ts), so that the temperature of the heat transfer fluid F is lower than the maximum operating temperature Tmax at the outlet of the engine enclosure EN-M, allowing it to circulate towards the tank enclosure EN-R, for example by passing through the wings of the aircraft. In this example, the third temperature T3 of the heat transfer fluid F at the outlet of the second engine exchanger 42 is between 77° C. (350K) and 227° C. (500K). In one embodiment, the third temperature T3 of the heat transfer fluid F is less than 202° C. (475K), preferably even less than 177° C. (450K), which allows the use of aluminum piping, allowing a much lighter control system 1 than the known control systems wherein the piping is made of stainless steel.

In the first tank exchanger 51, the heat transfer fluid F is configured to transfer a second part of calories to the fuel flow Qc. The heat transfer fluid F is then configured to be cooled to a fourth temperature T4, lower than the third temperature T3, so as to heat the fuel flow Qc to the primary temperature Tp, i.e. so as to warm the fuel flow Qc before it leaves the tank enclosure EN-R. In this example, the fourth temperature T4 of the heat transfer fluid F at the outlet of the first tank exchanger 51 is between 2° C. (275K) and 77° C. (350K), allowing to avoid any risk of icing of a hot source in the circulation loop 2.

In summary, in the control system 1, the heat transfer fluid F is configured to be cooled in two stages, once in the second engine exchanger 42 by transferring a first part of calories and a second time in the first tank exchanger 51 by transferring a second part of calories. In other words, in the conditioning system SC, the fuel flow Qc is configured to be heated in two stages, once in the first tank exchanger 51 by the second part of calories present in the heat transfer fluid F and a second time in the second engine heat exchanger 42 by the first part of calories present in the heat transfer fluid F.

In one embodiment, with reference to FIG. 3, the control system 1 comprises a second tank exchanger 52 mounted in the tank enclosure EN-R on the tank branch 22. The second tank exchanger 52 is configured to warm the heat transfer fluid F from calories transferred by one or more hot fluids Cr available in the tank enclosure EN-R. In a first embodiment, the second tank exchanger 52 is mounted downstream of the first tank exchanger 51, so the second tank exchanger 52 is configured to heat the warm the heat transfer fluid F from the fourth temperature T4 to the first temperature T1. In a second embodiment (not shown), the second tank exchanger 52 is mounted upstream of the first tank exchanger 51 to increase the temperature of the heat transfer fluid F before it enters the first tank exchanger 51, so that the heat transfer fluid F transfers more calories to the fuel flow Qc in the first tank exchanger 51 and warms it to a higher temperature.

In this embodiment, the fourth temperature T4 of the heat transfer fluid F at the outlet of the first tank exchanger 51 is between −123° C. (150K) and 2° C. (275K).

In this embodiment, the fourth temperature T4 corresponds to the lowest temperature that the heat transfer fluid F reaches in the entire circulation loop 2. Also, in this example, the mechanical pump 3 is preferably mounted between the first tank exchanger 51 and the second tank exchanger 52, so as to take advantage of the minimum temperature and therefore the maximum density of the heat transfer fluid F, as described above.

This document presents an example wherein the control system 1 comprises two engine exchangers 41, 42 and one or two tank exchangers 51, 52, it being understood that the control system 1 could comprise a different number of engine exchangers 41, 42 and/or tank exchangers 51, 52, in particular a number greater than two tank exchangers and/or a number greater than or equal to two engine exchangers.

Figure 4:
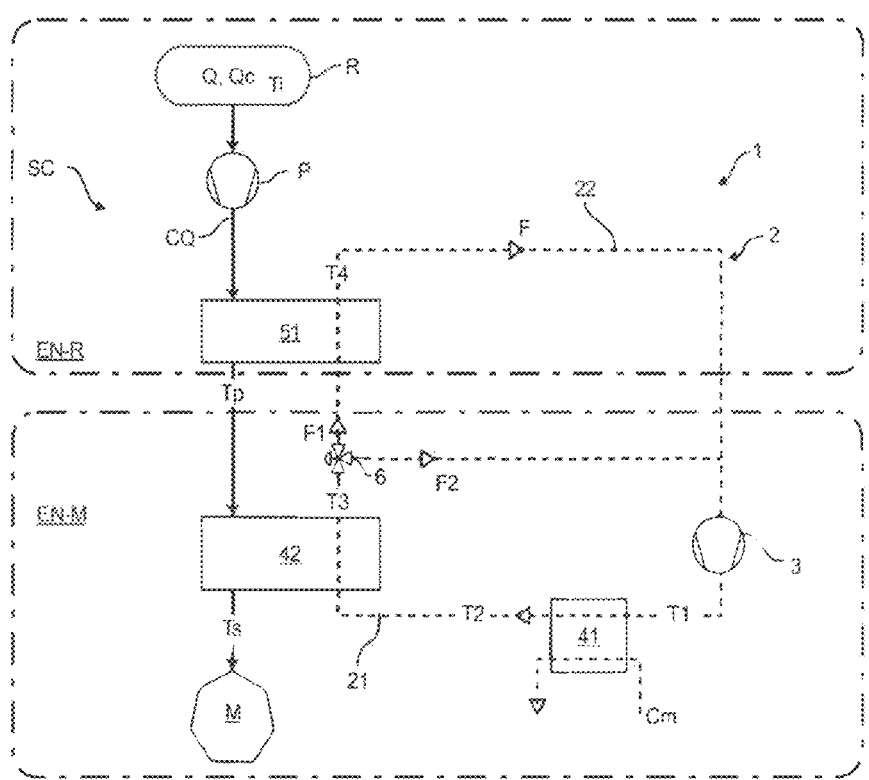
FIG. 4 is a schematic representation of a control system according to a third embodiment of the invention.

In one embodiment, with reference to FIG. 4, the control system 1 comprises a controllable valve 6 mounted on the circulation loop 2 between the second engine exchanger 42 and the first tank exchanger 51. The controllable valve 6 allows to direct a first part of the heat transfer fluid F1 towards the first tank exchanger 51 and towards the engine enclosure EN-M and a second part of the heat transfer fluid F2 towards the first engine exchanger 41. A lower flow rate of heat transfer fluid F is thus conveyed towards the engine enclosure EN-M, allowing to regulate the circulation loop 2 while maintaining an optimum extraction of calories from the engine sources.

In this example, the controllable valve 6 is mounted in the engine enclosure EN-IM, as shown in FIG. 4. Of course, the controllable valve 6 could also be mounted in the tank enclosure EN-R.

Figure 5:
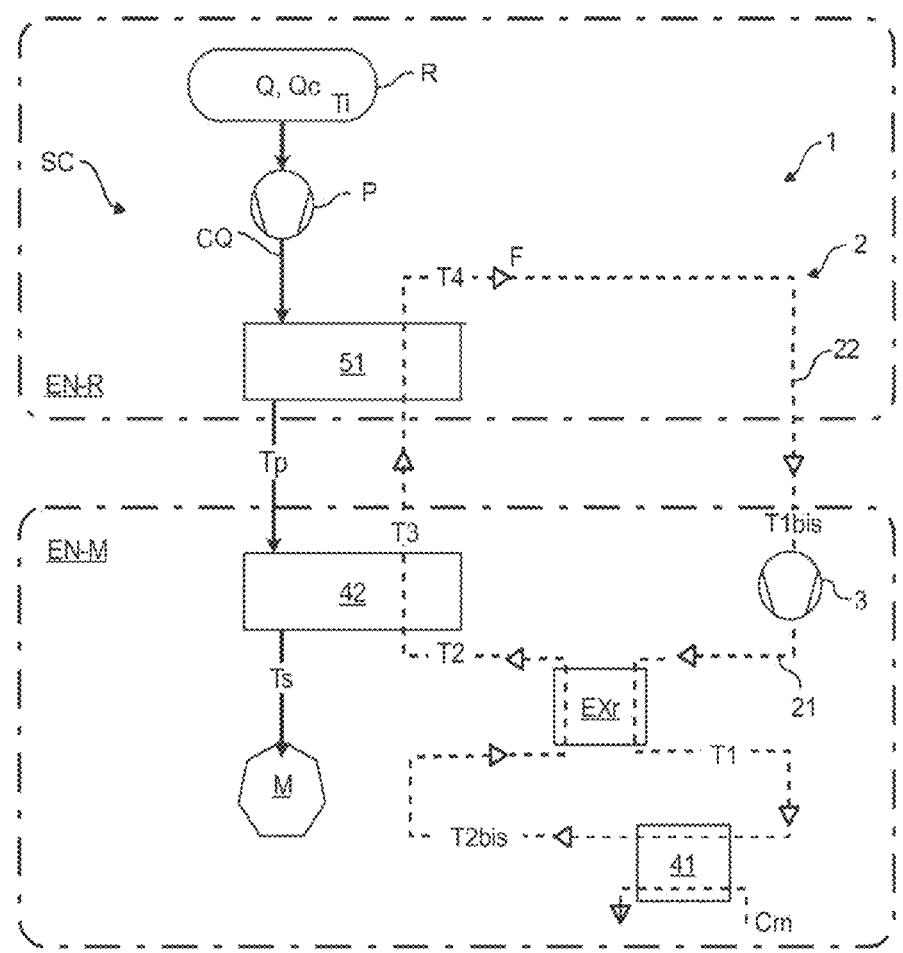
FIG. 5 is a schematic representation of a control system according to a third embodiment of the invention.

In one embodiment, with reference to FIG. 5, the control system 1 comprises a regenerative heat exchanger Exr, mounted on the circulation loop 2 in the engine enclosure EN-M, i.e. on the engine branch 21. The regenerative heat exchanger Exr is of the heat transfer fluid/heat transfer fluid type and is configured to warm the heat transfer fluid F upstream of the first engine exchanger 41 by the heat transfer fluid F downstream of this first engine exchanger 41. In other words, the heat transfer fluid F is configured to be warmed upstream of the first engine exchanger 41 by the heat transfer fluid F which will have been reheated by the first engine exchanger 41.

The heat transfer fluid F is thus configured to enter the engine enclosure EN-M at a temperature T1bis lower than the minimum operating temperature Tmin and to be warmed in the regenerator exchanger Exr to a temperature higher than the minimum operating temperature Tmin, up to the first temperature T1, before entering the first engine exchanger 41 to avoid any risk of icing of the hot source. In other words, in the tank enclosure EN-R at the outlet of the first tank exchanger 51, the heat transfer fluid F is configured to be cooled below the minimum operating temperature Tmin, allowing more calories to be transferred to the fuel flow Qc. In this embodiment, the heat transfer fluid F is configured to be warmed from the temperature T1bis to the first temperature T1 in the regenerator exchanger Exr, then to be heated to a temperature T2bis in the first engine exchanger 41. The heat transfer fluid F is then configured to be cooled in the regenerative exchanger Exr (by reheating the heat transfer fluid F circulating upstream of the first engine exchanger 41) to the second temperature T2 before entering the second engine exchanger 42.

In a first embodiment (shown in FIG. 5), the regenerative heat exchanger Exr is configured to be mounted on the circulation loop 2 upstream of the second engine exchanger 42. In a second embodiment (not shown), the regenerative heat exchanger Exr is configured to be mounted on the circulation loop 2 downstream of the second engine exchanger 42.

Figure 6:
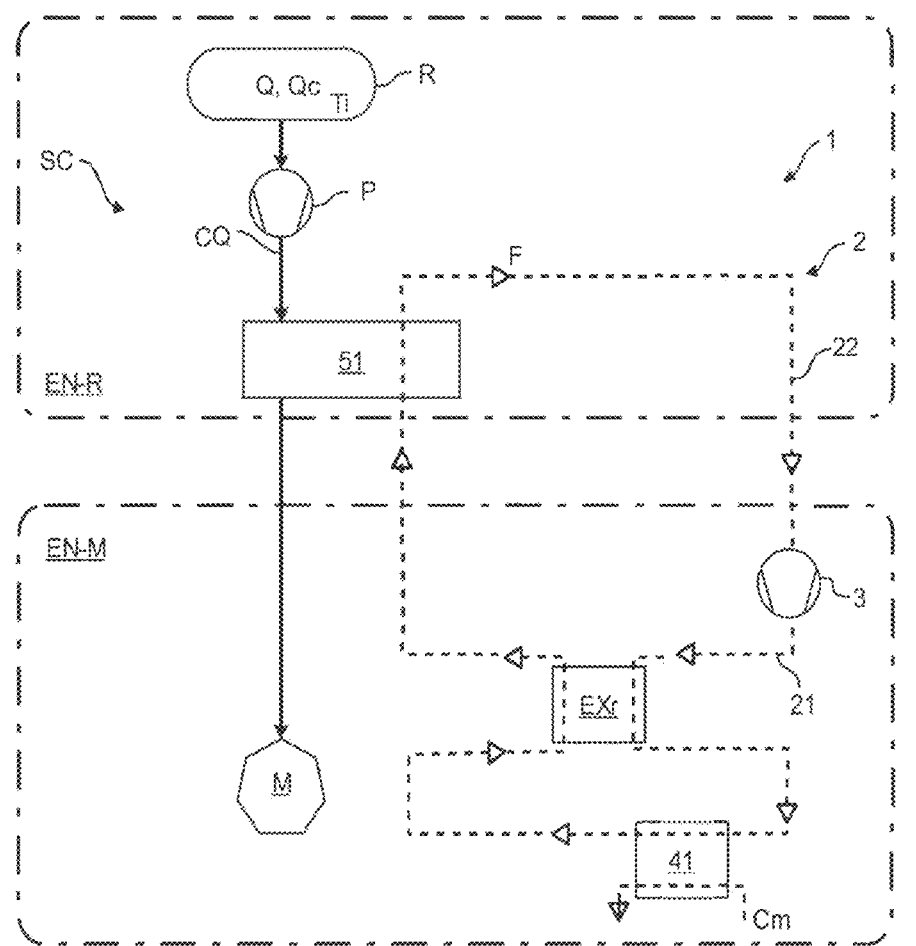
FIG. 6 is a schematic representation of a control system according to a fourth embodiment of the invention.

Presented is a regenerative exchanger Exr mounted in a control system 1 which comprises a first engine exchanger 41 for warming the heat transfer fluid F and a first tank exchanger 51 and a second engine exchanger 42 for warming the fuel flow Q respectively in the tank enclosure EN-R and in the engine enclosure EN-M. In one embodiment, the control system 1 may alternatively comprise a regenerative exchanger Exr and be free of the second engine exchanger 42. as shown in FIG. 6. In this embodiment, the cold heat transfer fluid F entering the engine enclosure EN-M and therefore entering the regenerative exchanger Exr may be effectively warmed by the hot heat transfer fluid F leaving the first engine exchanger 41 since the latter may transfer a large number of calories before being directed directly towards the tank enclosure EN-R.

A method for controlling the temperature of the heat transfer fluid F will now be described with reference to FIG. 2. The heat transfer fluid F is at the engine inlet point P1m of the engine enclosure EN-M at a first temperature T1 higher than the minimum operating temperature Tmin. In this example, the first temperature T1 is greater than 2° C. (275K).

The method comprises a first step E1 of heating the heat transfer fluid F in the first engine exchanger 41 of the engine enclosure EN-M, to a second temperature T2, higher than the maximum operating temperature Tmax. In this example, the heat transfer fluid F is heated in step E1 to a temperature of between 227° C. (500K) and 377° C. (650K).

The heat transfer fluid F then circulates in the circulation loop 2 in the engine enclosure EN-M, i.e. in the engine branch 21, as far as the second engine heat exchanger 42. In a second step E2, the heat transfer fluid F then passes through the second engine heat exchanger 42, where it transfers a first part of its calories to the fuel flow Qc. The heat transfer fluid F is cooled a first time to a third temperature T3, below the maximum operating temperature Tmax. In this example, the heat transfer fluid F is cooled in the second engine exchanger 42 to a temperature of between 77° C. (350K) and 227° C. (500K).

The heat transfer fluid F is then conveyed, in step E3, towards the tank enclosure EN-R. In a fourth step E4, the heat transfer fluid F passes through the first tank exchanger 51 in the tank enclosure EN-R wherein it transfers a second part of its calories to the fuel flow Qc. The heat transfer fluid F is cooled a second time to the fourth temperature T4. In this example, the heat transfer fluid F is cooled in the first tank exchanger 51 to a temperature of between −123° C. (150K) and 2° C. (250K).

The heat transfer fluid F circulates in the circulation loop 2 in the tank enclosure EN-R, i.e. in the tank branch 22, to be conveyed to the engine enclosure EN-M where it is warmed again in the first engine exchanger 41.

The invention claimed is:
1. A fuel conditioning system configured to supply an aircraft turbomachine with fuel from a cryogenic tank wherein it is stored at an initial temperature, the conditioning system extending in a tank enclosure and in an engine enclosure distinct from the tank enclosure, the cryogenic tank being mounted in the tank enclosure and the turbomachine being mounted in the engine enclosure, the tank enclosure being configured to operate at a temperature lower than a maximum operating temperature, the engine enclosure being configured to operate at a temperature above a minimum operating temperature, the conditioning system comprising:
    a fuel circuit connected at the inlet to the cryogenic tank and at the outlet to the turbomachine, a fuel flow circulating from upstream to downstream in the fuel circuit,
    at least one mechanical pump configured to circulate the fuel flow from the cryogenic tank from upstream to downstream in the fuel circuit, and
    a temperature control system for controlling the temperature of a heat transfer fluid configured to transfer calories to the fuel flow, the control system comprising:
    a circulation loop for circulating the heat transfer fluid extending both in the tank enclosure and in the engine enclosure, the circulation loop comprising:
        an engine branch extending in the engine enclosure between an engine inlet point and an engine outlet point, the heat transfer fluid circulating from upstream to downstream between the engine inlet point and the engine outlet point, the heat transfer fluid having a first temperature at the engine inlet point, the first temperature being greater than the minimum operating temperature of the engine enclosure, a tank branch extending in the tank enclosure between a tank inlet point and a tank outlet point, the heat transfer fluid circulating from upstream to downstream between the tank inlet point and the tank outlet point, the engine outlet point being fluidly connected to the tank inlet point, the tank outlet point being fluidly connected to the engine inlet point, at least one first engine heat exchanger, mounted on the engine branch, configured to warm the heat transfer fluid to a second temperature higher than the first temperature, from calories transferred by at least one hot fluid available in the engine enclosure, the second temperature being higher than the maximum operating temperature of the tank enclosure, at least one first tank exchanger, mounted on the tank branch, configured to warm the fuel flow from the heat transfer fluid to a primary temperature, at least one second engine exchanger, mounted on the engine branch, configured to warm the fuel flow from the heat transfer fluid to a secondary temperature higher than the primary temperature, at least one mechanical pump configured to circulate the heat transfer fluid in the circulation loop so as to:
  in the second engine heat exchanger, transferring a first part of calories from the heat transfer fluid to the fuel flow and cooling the heat transfer fluid to a third temperature lower than the second temperature, the third temperature being lower than the maximum operating temperature, so as to heat the heat transfer fluid in the first engine exchanger to a temperature higher than the maximum operating temperature and to lower this temperature in the second engine exchanger below the maximum operating temperature, before it leaves the engine enclosure and enters the tank enclosure,
  in the first tank exchanger, transferring a second part of calories from the heat transfer fluid to the fuel flow and cooling the heat transfer fluid to a fourth temperature, lower than the third temperature, so as to heat the fuel flow to the primary temperature, so as to warm the fuel flow before it leaves the tank enclosure.

2. The conditioning system according to claim 1, wherein the control system comprises at least one second tank exchanger, mounted on the tank branch, the second tank exchanger being configured to warm the heat transfer fluid from calories transferred by at least one hot fluid available in the tank enclosure.

3. The conditioning system according to claim 2, wherein the fourth temperature of the heat transfer fluid at the outlet of the first tank exchanger is between −123° C. (150K) and 2° C. (275K).

4. The conditioning system according to claim 1, wherein the fourth temperature of the heat transfer fluid at the outlet of the first tank exchanger is between 2° C. (275K) and 77° C. (350K).

5. The conditioning system according to claim 1, wherein the second temperature of the heat transfer fluid at the outlet of the first engine exchanger is between 227° C. (500K) and 377° C. (650K).

6. The conditioning system according to claim 1, wherein the third temperature of the heat transfer fluid at the outlet of the second engine exchanger is between 77° C. (350K) and 227° C. (500K).

7. The conditioning system according to claim 6, wherein the third temperature of the heat transfer fluid at the outlet of the second engine exchanger is less than 202° C. (475K).

8. The conditioning system according to claim 1, wherein the control system comprises a controllable valve mounted on the circulation loop between the second engine exchanger and the first tank exchanger, so as to direct a first part of the heat transfer fluid towards the first tank exchanger and towards the engine enclosure and a second part of the heat transfer fluid towards the first engine exchanger, so as to allow a lower flow rate of the heat transfer fluid towards the engine enclosure.

9. The conditioning system according to claim 1, wherein the control system comprises a regenerative heat exchanger, mounted on the engine branch, the regenerative heat exchanger being configured to warm the heat transfer fluid upstream of the first engine exchanger by the heat transfer fluid downstream of the first engine exchanger.

10. The conditioning system according to claim 1, wherein the primary temperature of the fuel flow at the outlet of the first tank exchanger is between −173° C. (100K) and −73° C. (200K).

11. The conditioning system according to claim 1, wherein the secondary temperature of the fuel flow at the outlet of the second engine exchanger is between −73° C. (200K) and 27° C. (300K).

12. An aircraft comprising a cryogenic tank, a turbomachine and a conditioning system according to claim 1.

13. A method for controlling the temperature of the heat transfer fluid by means of the control system of a conditioning system according to claim 1, the method comprising the steps consisting in:
  heating the heat transfer fluid in the engine enclosure in the first engine exchanger to a second temperature above the maximum operating temperature of the tank enclosure,
  cooling the heat transfer fluid in the engine enclosure in the second engine exchanger to a third temperature below the maximum operating temperature,
  conveying the heat transfer fluid towards the tank enclosure.

* * * * *